(12) United States Patent
Kojima et al.

(10) Patent No.: US 10,974,611 B2
(45) Date of Patent: Apr. 13, 2021

(54) MOTOR-DRIVEN VEHICLE

(71) Applicant: Toyota Jidosha Kabushiki Kaisha, Toyota (JP)

(72) Inventors: Koichi Kojima, Toyota (JP); Akito Motohira, Toyota (JP); Tomoya Ono, Toyota (JP); Yuya Aoki, Miyoshi (JP); Shingo Yumoto, Toyota (JP); Takeshi Aridome, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 56 days.

(21) Appl. No.: 16/560,069

(22) Filed: Sep. 4, 2019

(65) Prior Publication Data

US 2020/0139832 A1    May 7, 2020

(30) Foreign Application Priority Data

Nov. 7, 2018   (JP) .............................. JP2018-209565

(51) Int. Cl.
*B60L 3/00*        (2019.01)
*B60L 53/22*       (2019.01)
(Continued)

(52) U.S. Cl.
CPC .................. *B60L 53/22* (2019.02); *B60L 3/00* (2013.01); *B60L 53/14* (2019.02); *H01H 47/002* (2013.01);
(Continued)

(58) Field of Classification Search
CPC ....................................................... B60L 53/22
(Continued)

(56) References Cited

U.S. PATENT DOCUMENTS

2013/0249282 A1*  9/2013  Ishii ........................ B60L 53/11
                                                     307/10.1
2015/0298568 A1* 10/2015  Mitsutani ................ B60L 58/14
                                                      307/9.1
(Continued)

FOREIGN PATENT DOCUMENTS

JP          2016-073110 A       5/2016

OTHER PUBLICATIONS

U.S. Appl. No. 16/566,340, filed Sep. 10, 2019 Inventors: Akito Motohira et al.

*Primary Examiner* — Rexford N Barnie
*Assistant Examiner* — Dru Parries
(74) *Attorney, Agent, or Firm* — Dinsmore & Shohl LLP

(57) ABSTRACT

A motor-driven vehicle includes a system main relay that is attached to a running electric power line connecting a power storage device to a drive circuit, a capacitor that is attached to the running electric power line between the system main relay and the drive circuit, and a charging relay that is attached to a charging electric power line connecting a vehicle-side connector to the running electric power line between the system main relay and the drive circuit. When a stand-side connector is disconnected from the vehicle-side connector while the power storage device is being charged with electric power from a direct-current charging stand, the charging relay and the system main relay are turned off, a two-pole welding abnormality of the charging relay is diagnosed using a voltage of the capacitor, and then the capacitor is discharged.

2 Claims, 2 Drawing Sheets

(51) Int. Cl.
  *H02P 27/06*  (2006.01)
  *B60L 53/14*  (2019.01)
  *H01H 47/00*  (2006.01)
  *H02J 7/00*  (2006.01)
(52) U.S. Cl.
  CPC ............... *H02J 7/00* (2013.01); *H02P 27/06* (2013.01); *B60Y 2200/91* (2013.01); *B60Y 2300/91* (2013.01)
(58) Field of Classification Search
  USPC ........................................................ 307/10.1
  See application file for complete search history.

(56) References Cited

U.S. PATENT DOCUMENTS

2015/0375621 A1* 12/2015 Ono ........................ H02J 7/02
  307/10.1
2017/0015200 A1* 1/2017 Hatanaka ................ B60L 53/16

* cited by examiner

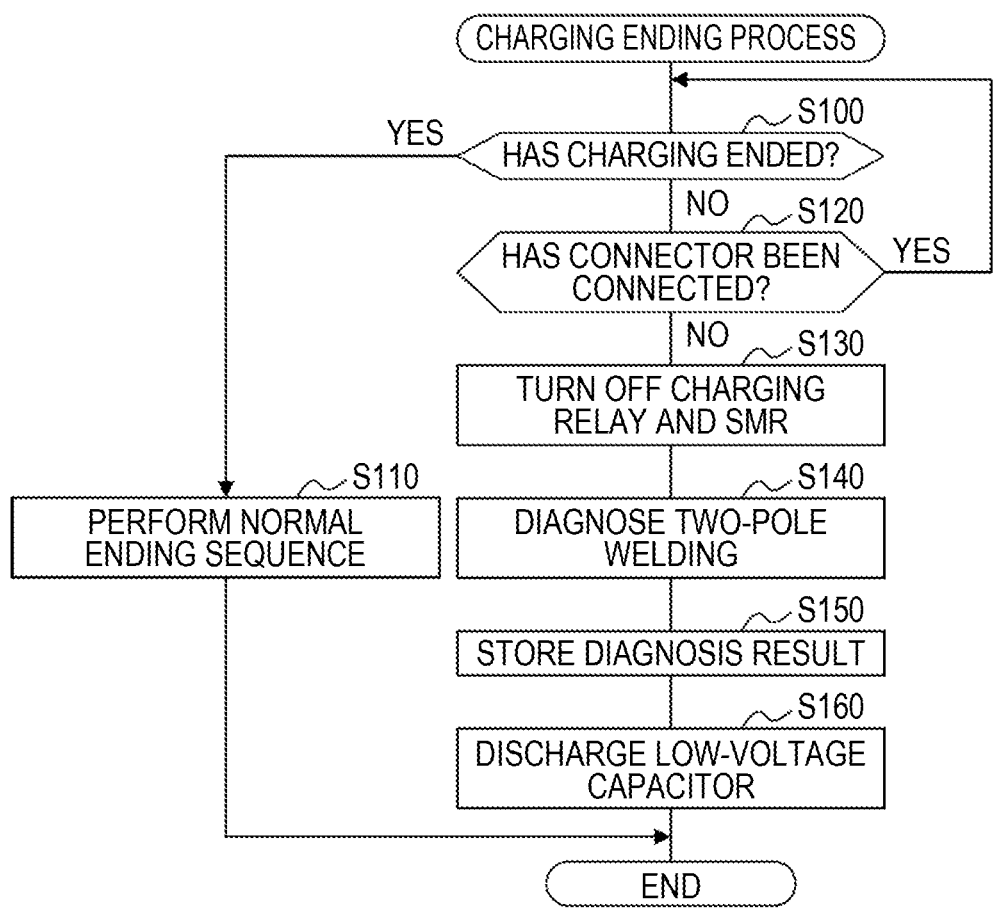

MOTOR-DRIVEN VEHICLE

CROSS-REFERENCE TO RELATED APPLICATIONS

This application claims priority to Japanese Patent Application No. 2018-209565 filed on Nov. 7, 2018, which is incorporated herein by reference in its entirety including the specification, drawings and abstract.

BACKGROUND

1. Technical Field

The disclosure relates to a motor-driven vehicle and more particularly to a motor-driven vehicle in which an onboard power storage device is charged with electric power from a direct-current charging stand outside the vehicle.

2. Description of Related Art

In the related art, a motor-driven vehicle in which welding of a charging relay is diagnosed after charging of a power storage device with electric power from a direct-current charging stand outside the vehicle has ended has been proposed as such a type of motor-driven vehicle (for example, see Japanese Unexamined Patent Application Publication No. 2016-073110 (JP 2016-073110 A)). In such a vehicle, a stand-side connector is detached from an inlet after charging has ended and welding of the charging relay is diagnosed after a lid covering the inlet has been closed.

SUMMARY

However, in a case in which welding of a charging relay is diagnosed after a lid covering an inlet has been closed, this technique cannot be applied to a vehicle in which a lid of an inlet is not provided. When a lid is provided in an inlet but closing of the lid cannot be detected, welding of a charging relay cannot be diagnosed. When welding of a charging relay cannot be diagnosed, a stand-side connector may be pressed to be connected to an inlet, it may be ascertained that the stand-side connector is connected to the inlet, and welding of the charging relay may be diagnosed. However, when two poles of a charging relay are welded, there is a concern that a device may be damaged due to a large current flowing at the time of connection of the stand-side connector to the inlet.

A main objective of the disclosure is to provide a motor-driven vehicle that can reliably diagnose two-pole welding of a charging relay when a stand-side connector of a direct-current charging stand outside the vehicle is disconnected from a vehicle-side connector.

A motor-driven vehicle according to the disclosure employs the following configurations to achieve the above-mentioned objective.

A motor-driven vehicle according to the disclosure includes: an electric motor that outputs running power; a drive circuit that drives the electric motor; a power storage device; a system main relay that is attached to a running electric power line connecting the power storage device to the drive circuit; a capacitor that is attached to the running electric power line between the system main relay and the drive circuit; a vehicle-side connector that is connected to a stand-side connector of a direct-current charging stand outside the vehicle; a charging relay that is attached to a charging electric power line connecting the vehicle-side connector to the running electric power line between the system main relay and the drive circuit; and a control device that controls the system main relay and the charging relay. When the stand-side connector is disconnected from the vehicle-side connector while the power storage device is being charged with electric power from the direct-current charging stand, the control device turns off the charging relay, turns off the system main relay, diagnoses a two-pole welding abnormality of the charging relay in that state, and discharges the capacitor.

In the motor-driven vehicle according to the disclosure, when the stand-side connector is disconnected from the vehicle-side connector while the power storage device is being charged with electric power from the direct-current charging stand, the charging relay is turned off and the system main relay is turned off. Then, a two-pole welding abnormality of the charging relay is diagnosed in that state and the capacitor is discharged. That is, the two-pole welding abnormality of the charging relay is diagnosed using a voltage of the capacitor. Accordingly, even when the vehicle-side connector and the stand-side connector are unexpectedly disconnected from each other during charging or when the vehicle-side connector and the stand-side connector are intentionally disconnected from each other during charging, it is possible to reliably diagnose a two-pole welding abnormality of the charging relay.

In the motor-driven vehicle according to the disclosure, the control device may diagnose the two-pole welding abnormality of the charging relay using a voltage of the charging electric power line between the charging relay and the vehicle-side connector. For example, it may be diagnosed that a two-pole welding abnormality has occurred in the charging relay when the voltage between the charging relay and the vehicle-side connector of the charging electric power line is equal to or higher than a threshold value, and it may be diagnosed that a two-pole welding abnormality has not occurred in the charging relay when the voltage between the charging relay and the vehicle-side connector of the charging electric power line is less than the threshold value. In this case, a voltage which is lower than the voltage of the capacitor at the time of charging and higher than a value of 0 can be used as the threshold value.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a flowchart illustrating an example of a charging ending process which is performed by an electronic control unit 70.

DETAILED DESCRIPTION OF EMBODIMENTS

Figure 1:
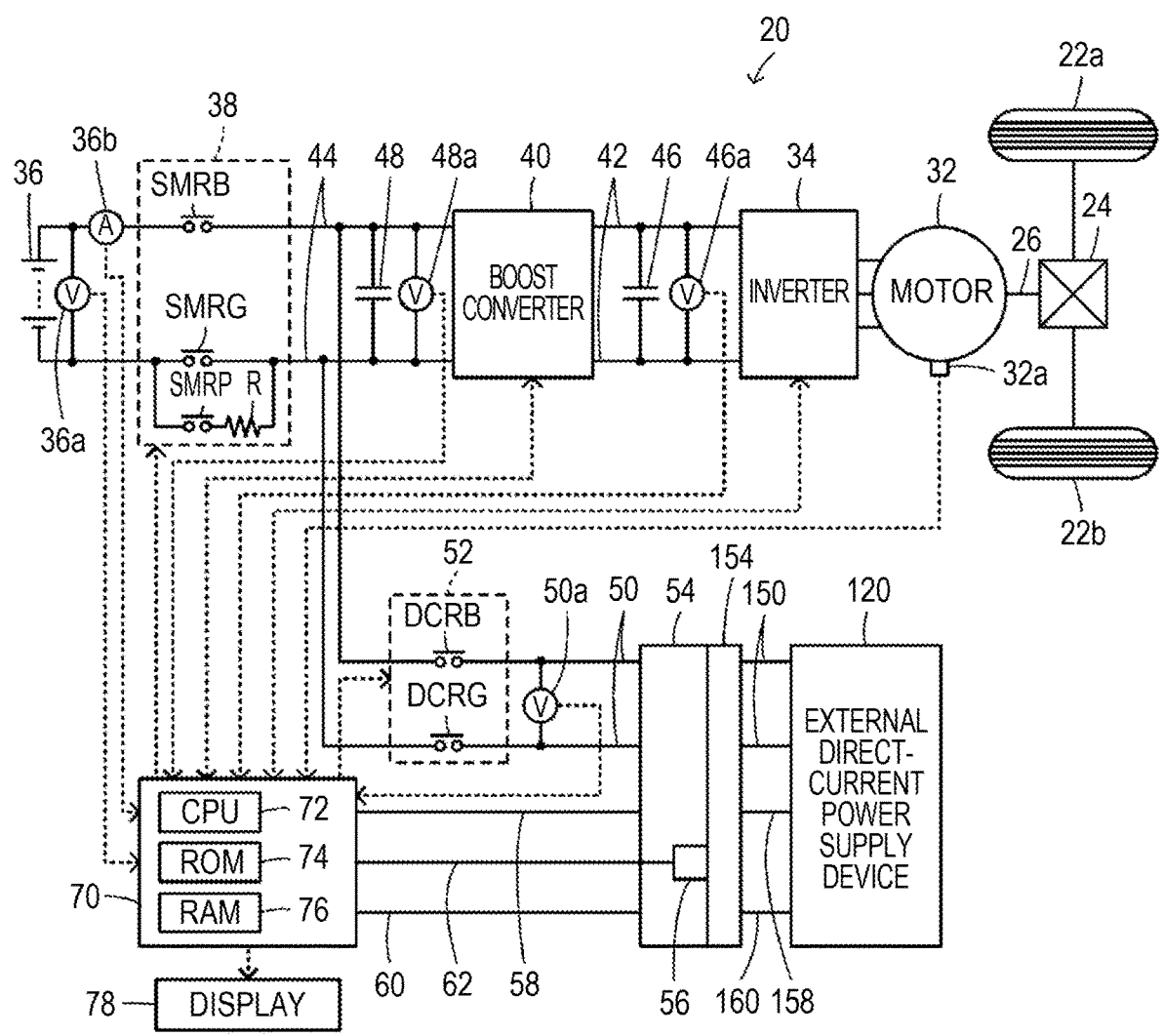
FIG. 1 is a diagram schematically illustrating a configuration of an electric vehicle 20 according to an embodiment of the disclosure.

An embodiment of the disclosure will be described below.
FIG. 1 is a diagram schematically illustrating a configuration of an electric vehicle 20 according to an embodiment of the disclosure. As illustrated in the drawing, the electric vehicle 20 according to the embodiment includes a motor 32, an inverter 34, a battery 36, a boost converter 40, a high-voltage power line 42, a low-voltage power line 44, a system main relay 38, a charging electric power line 50, a vehicle-side inlet 54, and an electronic control unit 70.

The motor 32 is configured as a synchronous generator motor and includes a rotor that has a permanent magnet embedded therein and a stator on which three-phase coils are wound. The rotor of the motor 32 is connected to a drive shaft 26 which is connected to driving wheels 22a and 22b via a differential gear 24.

The inverter 34 is connected to the motor 32 and is also connected to the high-voltage power line 42. The inverter 34 is configured as a known inverter circuit including six transistors and six diodes.

The battery 36 is configured, for example, as a lithium-ion secondary battery or a nickel-hydride secondary battery and is connected to the low-voltage power line 44.

The boost converter 40 is connected to the high-voltage power line 42 and the low-voltage power line 44 and is configured as a known step-up/down converter circuit including two transistors, two diodes, and a reactor.

A high-voltage capacitor 46 is connected to a positive electrode bus and a negative electrode bus of the high-voltage power line 42, and a low-voltage capacitor 48 is connected to a positive electrode bus and a negative electrode bus of the low-voltage power line 44. The system main relay 38 is attached to the low-voltage power line 44. The system main relay 38 includes a positive-electrode relay SMRB that is provided in the positive electrode bus of the low-voltage power line 44, a negative-electrode relay SMRG that is provided in the negative electrode bus of the low-voltage power line 44, and a precharge circuit in which a precharge resistor R and a precharge relay SMRP are connected in series to bypass the negative-electrode relay SMRG.

One end of the charging electric power line 50 is connected to the boost converter 40 side (the motor 32 side) of the low-voltage power line 44 rather than the system main relay 38 side and the other end thereof is connected to the vehicle-side inlet 54. A charging relay 52 is attached to the charging electric power line 50. The charging relay 52 includes a positive-electrode relay DCRB that is provided on a positive-electrode line of the charging electric power line 50 and a negative-electrode relay DCRG that is provided in a negative-electrode line of the charging electric power line 50. The charging electric power line 50 is connected to an external charging electric power line 150 from an external direct-current power supply device 120 by connecting an external connector 154 of the external direct-current power supply device 120 to the vehicle-side inlet 54. Although not illustrated in the drawing, the external direct-current power supply device 120 is connected to an external commercial power supply, converts electric power from the commercial power supply into direct-current (DC) power, and supplies the DC power to the external charging electric power line 150.

When the external connector 154 is connected to the vehicle-side inlet 54, a connection line 58 that is connected to an external connection line 158 of the external direct-current power supply device 120 via an external connector 154 and a communication line 60 that is connected to an external communication line 160 connected to the external direct-current power supply device 120 via the external connector 154 are connected to the vehicle-side inlet 54.

Although not illustrated in the drawing, the electronic control unit 70 is configured as a microprocessor such as a CPU 72, and includes a ROM 74 that stores a processing program, a RAM 76 that temporarily stores data, a flash memory which is not illustrated, input and output ports which are not illustrated, and a communication port which is not illustrated in addition to the CPU 72.

Signals from various sensors are input to the electronic control unit 70 via the input port. Examples of the signals input to the electronic control unit 70 include a rotational position θm from a rotational position sensor (for example, a resolver) 32a that detects a rotational position of the rotor of the motor 32, a voltage VB from a voltage sensor 36a that is attached between the terminals of the battery 36, and a current IB from a current sensor 36b that is attached to an output terminal of the battery 36. Examples thereof further include a voltage VH of the high-voltage capacitor 46 (the high-voltage power line 42) from a voltage sensor 46a that is attached between terminals of the high-voltage capacitor 46 and a voltage VL of the low-voltage capacitor 48 (the low-voltage power line 44) from a voltage sensor 48a that is attached between terminals of the low-voltage capacitor 48. In addition, a charging voltage Vchg from a voltage sensor 50a that is attached to the charging electric power line 50 is also input to the electronic control unit 70. A connection line 58 connected to the vehicle-side inlet 54 or a lead signal line 62 from a lead sensor 56 that is attached to the vehicle-side inlet 54 is connected to the input port of the electronic control unit 70. The electronic control unit 70 also serves as a driving controller of a vehicle and thus receives information required for running control thereof. Although not illustrated in the drawing, Examples of such information include an ignition signal from an ignition switch, a shift position from a shift position sensor that detects an operation position of a shift lever, an accelerator pedal position from an accelerator pedal position sensor that detects an amount of depression of an accelerator pedal, a brake pedal position from a brake pedal position sensor that detects an amount of depression of a brake pedal, and a vehicle speed from a vehicle speed sensor.

Various control signals are output from the electronic control unit 70 via the output port. Examples of the signals which are output from the electronic control unit 70 include a switching control signal to the transistors of the inverter 34, a switching control signal to the transistors of the boost converter 40, a drive control signal to the system main relay 38, a drive control signal to the charging relay 52, and a display signal to a display 78 that is disposed on an instrument panel in front of a driver's seat.

The electronic control unit 70 communicates with the external direct-current power supply device 120 when the communication line 60 connected to the communication port is connected to the external communication line 160.

An operation of the electric vehicle 20 according to the embodiment having the above-mentioned configuration, particularly, an operation when the external connector 154 is disconnected from the vehicle-side inlet 54 while the battery 36 is being charged with electric power from the external direct-current power supply device 120, will be described below. FIG. 2 is a flowchart illustrating an example of a charging ending process which is performed by the electronic control unit 70. This routine is performed when charging with electric power from the external direct-current power supply device 120 is started.

When the charging ending process is performed, the electronic control unit 70 first determines whether charging has ended (Step S100). Here, the determination of whether charging has ended in Step S100 is for determining whether charging has ended normally when the battery 36 is fully charged. When it is determined that charging has not ended normally, the electronic control unit 70 determines whether the external connector 154 is connected to the vehicle-side inlet 54 (Step S120). This determination can be performed by determining whether the connection line 58 connected to the vehicle-side inlet 54 is connected to the external connection line 158 connected to the external connector 154. When it is determined that the external connector 154 is connected to the vehicle-side inlet 54, the routine returns to the determination of whether charging has ended normally in Step S100. Accordingly, when the external connector 154 is connected to the vehicle-side inlet 54 until charging has ended normally, the processes of Steps S100 and S120 are repeatedly performed.

When it is determined in Step S100 that charging has ended normally, a normal ending sequence is performed (Step S110) and then this routine ends. Examples of the normal ending sequence include turning on and off the positive-electrode relay DCRB or the negative-electrode relay DCRG of the charging relay 52 in a state in which the system main relay 38 is turned on, diagnosing a welding abnormality of the positive-electrode relay DCRB or the negative-electrode relay DCRG storing the diagnosis result, and turning off the charging relay 52 and the system main relay 38.

When the external connector 154 is disconnected from the vehicle-side inlet 54 before charging has ended normally, the determination result of Step S120 is negative, the ending sequence of Steps S130 to S160 is performed, and then the routine ends. Examples of the case in which the external connector 154 is disconnected from the vehicle-side inlet 54 before charging has ended normally include a case in which the external connector 154 is unexpectedly disconnected from the vehicle-side inlet 54 and a ease in which charging is forcibly ended by detaching the external connector 154 from the vehicle-side inlet 54.

In the ending sequence when the determination result of Step S120 is negative, first, the charging relay 52 and the system main relay 38 are immediately turned off (Step S130) to prevent electric power on the battery 36 side from being supplied to the vehicle-side inlet 54. Subsequently, a two-pole welding abnormality of the charging relay 52 is diagnosed (Step S140). The two-pole welding abnormality of the charging relay 52 can be diagnosed by checking the charging voltage Vchg from the voltage sensor 50a. Since the low-voltage capacitor 48 is not discharged, the charging voltage Vchg is equal to the voltage VL of the low-voltage capacitor 48 or a value close thereto when a two-pole welding abnormality in which the positive-electrode relay DCRB and the negative-electrode relay DCRG of the charging relay 52 are welded has occurred, and is equal to 0 or a value close thereto when a two-pole welding abnormality has not occurred. Accordingly, it can be diagnosed that a two-pole welding abnormality has occurred when the charging voltage Vchg from the voltage sensor 50a is higher than a threshold value which is preset to a value lower than the voltage VL of the low-voltage capacitor 48, and it can be diagnosed that a two-pole welding abnormality has not occurred when the charging voltage Vchg is lower than the threshold value. When diagnosis of the two-pole welding abnormality of the charging relay 52 has been completed, the diagnosis result of the two-pole welding abnormality of the charging relay 52 is stored (Step S150), the low-voltage capacitor 48 is discharged (Step S160), and the sequence ends. The low-voltage capacitor 48 can be discharged by driving the switching elements of the boost converter 40 to consume energy. By performing this sequence, it is possible to diagnose a two-pole welding abnormality of the charging relay 52 even when charging has not ended normally.

In the electric vehicle 20 according to this embodiment, when the external connector 154 is unexpectedly disconnected from the vehicle-side inlet 54 or when charging is forcibly ended by detaching the external connector 154 from the vehicle-side inlet 54, the charging relay 52 and the system main relay 38 are turned off, a two-pole welding abnormality of the charging relay 52 is diagnosed using the voltage VL of the low-voltage capacitor 48, and an ending sequence of discharging the low-voltage capacitor 48 is performed after the diagnosis. Accordingly, it is possible to diagnose a two-pole welding abnormality of the charging relay 52 even when charging has not ended normally. As a result, when the external connector 154 of the external direct-current power supply device 120 is disconnected from the vehicle-side inlet 54 during charging, it is possible to more reliably diagnose a two-pole welding abnormality of the charging relay 52. When charging has ended normally, a welding abnormality of the poles of the charging relay 52 is basically diagnosed.

In the electric vehicle 20 according to the embodiment, the battery 36 is used as a power storage device, but a capacitor or the like may be used as long as it can store electric power. In the electric vehicle 20 according to the embodiment, the boost converter 40 is provided, but the boost converter 40 may not be provided.

In the embodiment, the disclosure is applied to the electric vehicle 20 including the motor 32. However, the disclosure may be applied to a hybrid vehicle including an engine in addition to the motor 32 or may be applied to a vehicle in which a fuel cell is mounted.

Correspondence between principal elements of the embodiment and principal elements of the disclosure described in the SUMMARY will be described below. In the embodiment, the motor 32 is an example of an "electric motor," the boost converter 40 or the inverter 34 is an example of a "drive circuit," the battery 36 is an example of a "power storage device," the system main relay 38 is an example of a "system main relay," the vehicle-side inlet 54 is an example of a "vehicle-side connector," the charging relay 52 is an example of a "charging relay," and the electronic control unit 70 is an example of a "control device."

The correspondence between the principal elements in the embodiment and the principal elements of the disclosure described in the SUMMARY does not limit the elements of the disclosure described in the SUMMARY, because the embodiment is an example for specifically describing an aspect of the disclosure described in the SUMMARY. That is, it should be noticed that the disclosure described in the SUMMARY has to be construed based on the description of the SUMMARY and the embodiment is only a specific example of the disclosure described in the SUMMARY.

While an embodiment of the disclosure has been described above, the disclosure is not limited to the embodiment and can be modified in various forms without departing from the gist of the disclosure.

The disclosure is applicable to industries for manufacturing motor-driven vehicles.

What is claimed is:
1. A motor-driven vehicle comprising:
an electric motor that outputs running power;
a drive circuit that drives the electric motor;
a power storage device;
a system main relay that is attached to a running electric power line connecting the power storage device to the drive circuit;

a capacitor that is attached to the running electric power line between the system main relay and the drive circuit;

a vehicle-side connector that is connected to a stand-side connector of a direct-current charging stand outside the vehicle;

a charging relay that is attached to a charging electric power line connecting the vehicle-side connector to the running electric power line between the system main relay and the drive circuit; and a control device that controls the system main relay and the charging relay, wherein, when the stand-side connector is disconnected from the vehicle-side connector while the power storage device is being charged with electric power from the direct-current charging stand, the control device turns off the charging relay, turns off the system main relay, diagnoses a two-pole welding abnormality of the charging relay in that state, and discharges the capacitor.

2. The motor-driven vehicle according to claim 1, wherein the control device diagnoses the two-pole welding abnormality of the charging relay using a voltage of the charging electric power line between the charging relay and the vehicle-side connector.

* * * * *

UNITED STATES PATENT AND TRADEMARK OFFICE
CERTIFICATE OF CORRECTION

| | |
|---|---|
| PATENT NO. | : 10,974,611 B2 |
| APPLICATION NO. | : 16/560069 |
| DATED | : April 13, 2021 |
| INVENTOR(S) | : Koichi Kojima et al. |

It is certified that error appears in the above-identified patent and that said Letters Patent is hereby corrected as shown below:

In the Specification

In Column 5, Line(s) 32, delete "ease" and insert --case--, therefor.

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*